United States Patent Office 3,148,936
Patented Sept. 15, 1964

3,148,936
BLENDING POLYOLEFIN WITH CHELATING
AGENT TO IMPROVE DYEABILITY
Albin F. Turbak, New Providence, N.J., assignor to Esso
Research and Engineering Company, a corporation of
Delaware
No Drawing. Filed Apr. 12, 1963, Ser. No. 272,550
7 Claims. (Cl. 8—42)

This invention relates to a process for treating alpha olefin polymers to render them dyeable.

Poly alpha olefin polymers have found increasing interest as textile fibers and materials because of their desirable properties of strength and low cost. One of the more difficult problems encountered, however, has been the poor dye acceptance of such fibers because of the inertness of a saturated hydrocarbon polymer. Although a poly alpha olefin material, such as polypropylene, can be dyed, its fastness to typical textile environments has been inadequate.

It has now been found that the receptivity of alpha olefin polymers to dyeing may be improved by blending the polymer with 0.1 to 20 weight percent, preferably 0.5 to 10.0 weight percent of an unmetallized chelating agent; spinning the blend into fibers; and then contacting the fibers with a dye solution of a specific class of metal-complexed dyes to which has been added a water soluble alkaline earth metal salt. When the polymer is treated in this manner, not only is the dye uptake improved, but more importantly, the resistance of the dyed product to light, washing, and dry cleaning is improved.

While this invention is principally directed to the dyeing of fibers or filaments, it may also be used to dye poly alpha olefin films, foils, and other formed products.

The polymers treated by the process of the invention are alpha olefin homopolymers and copolymers. The alpha olefin homopolymer can be prepared by any known process, such as the so-called Ziegler process, see for example Belgian Patent 533,362 and Belgian Patent 538,782. Examples of homopolymers within the scope of the invention include polyethylene, polypropylene, poly 1-butene, poly 1-heptene, and polyisobutylene. Polymers or copolymers of branched chain alpha olefins where the branching occurs no closer than the third carbon atom can also be employed such as poly 4,4-dimethyl-1-pentene, poly 4-methyl-1-pentene and poly 3-methyl-1-butene. In general, the homopolymers are prepared from alpha olefins having from 2 to 12 carbon atoms. The copolymers employed in the process of the invention include copolymers of two different alpha olefins such as ethylene-propylene copolymers, ethylene-1-hexene copolymers, and alpha olefin-aromatic olefin copolymers containing from 1 to 15% by weight of an aromatic olefin, such as for example copolymers of styrene and 4-methyl-1-pentene. Also, blends of one or more of the previously mentioned polymers can be employed. The polymers and copolymers employed in the invention have molecular weights ranging from 100,000 to 1,000,000. The preferred polymers and copolymers of the invention are those prepared by the use of alkyl metal catalysts. Most preferred is polypropylene. Catalysts which are useful in this process are mixtures of reducible heavy transition metal compounds and reducing metal containing substances, or mixtures of partially reduced heavy transition metal compounds and organometallic activators. Examples of these catalysts are $TiCl_4 + AlEt_3$ and $TiCl_3 + AlEt_3$. The catalysts used for preparing the preferred polymers employed in the instant process are those catalysts given on page 6, line 20, to page 10, line 21, of copending application Serial No. 831,210, filed August 3, 1959.

The chelating agents which are useful in this invention are those compounds which can bind heavy metals by means of intramolecular bonding. These include 8-hydroxyquinoline, 2-mercaptobenzothiazole, picolinic acid, quinolinic acid or partial esters thereof, ethylenedinitrilotetraacetonitrile, diguanidine, propyl gallate or other higher gallic acid esters, phthalonitrile, partial esters of ethylenedinitrilotetraacetic acid, iminotriacetic acid, $\alpha,\alpha'$-dipyridyl, and poly $\alpha$-pyridyl. Preferred are 2-mercaptobenzothiazole, $\alpha,\alpha'$-dipyridyl and poly $\alpha$-pyridyl. Most preferred is poly $\alpha$-pyridyl.

An additional qualification for the chelating agents used in this invention is that they have a chelate formation constant with the metal of the metal-complexed dye which is at least $1 \times 10^4$. The chelation formation constant is a measure of the ability of the chelating agent to complex with the metal and is defined by the equation:

$$\underset{(I)}{\text{Chelating agent}} + \underset{(II)}{\text{metal}} \rightarrow \underset{(III)}{\text{metal chelate}}$$

where $$\text{Chelation constant } K = \frac{[III]}{[I][II]}$$

The concentration of each member of the equation may be measured in moles/liter and K must be at least $1 \times 10^4$, or expressed in another way log K must be at least 4.0.

Thus, for example, log K for 8-hydroxyquinoline with various metals is as follows:

With cobalt 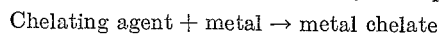 log K=11.55
With nickel_____ log K=11.44
With chromium_____ log K=11+

The dyes which are suitable for use in this invention are those metal pre-complexed aromatic dyes which contain at least one of the following functional groups: (1) an o,o'-dihydroxy azo function, (2) an o-carboxy, o'-hydroxy azo function, (3) an o-amino, o'-hydroxy azo function. Additionally, these dyes must contain no more than one sulfonic acid group, preferably none at all.

The metals which may be complexed with the dyes for purposes of this invention include nickel, copper, aluminum, iron, cobalt, and chromium, preferably chromium. These metals are combined with the dye in a 1/1 mole ratio of metal to dye so that the metal has residual complexing capacity. It is important to note that the metal forms a complex with the dye rather than a compound or salt. When two molecules of dye are pre-complexed with the metal, the metal has limited residual complexing ability and is not operable in this invention.

Examples of dyes operative in this invention are Neolan Orange G (chrome complex of Acid Orange 74), Neolan Blue 2G Conc. (chrome complex of Acid Blue 158A), Neolan Green BL Conc. (chrome complex of Acid Green 12), Neolan Yellow BE Ex Conc. (chrome complex of Acid Yellow 54), and Neolan Violet Brown B (chrome complex of Acid Red 184). In naming these dyes, the Color Index designation is added in parentheses to provide a second means of identification.

Dyes which do not conform to the above description are not operative in this invention. Thus, chromed salicylic type dyes such as chromed Fast Mordant Yellow GD Conc. (chrome complex of Mordant Yellow 16) are not useful. Additionally, dyes which contain more than one sulfonic acid group such as Neolan Red GRE (chrome complex of Acid Red 183) and Neolan Yellow BE (chrome complex of Acid Yellow 54) are not operative. Furthermore, dyes which are metallized so as to form any compound or salt of the metal other than a complex do not fall within the limits of this invention.

Table I lists the structure of some of the dyes employed in the experiments of this invention.

*Table I*

STRUCTURES OF NEOLAN DYES (1) Good Dyes (equimolar chrome complexes of):
(a) Neolan Green BL

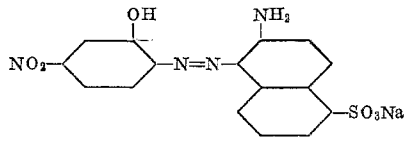

(b) Neolan Dark Green B

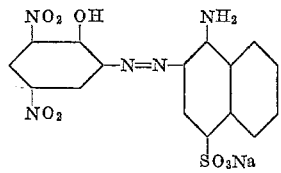

(c) Neolan Violet Brown B

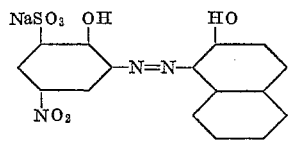

(d) Neolan Yellow GR

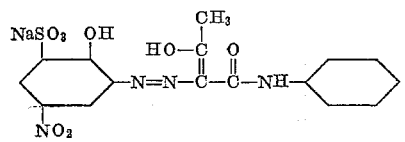

(e) Neolan Orange G

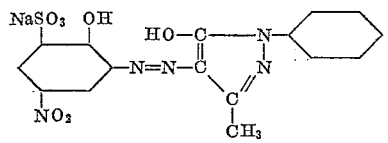

(f) Neolan Violet 3R

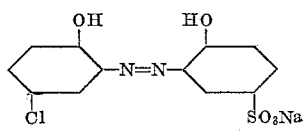

(g) Neolan Orange R

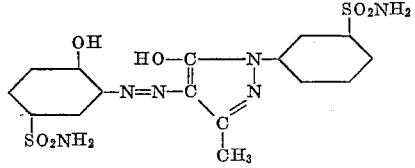

(h) Neolan Blue 2G

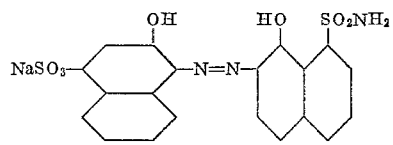

(2) Poor dyes:
(a) Neolan Red GRE

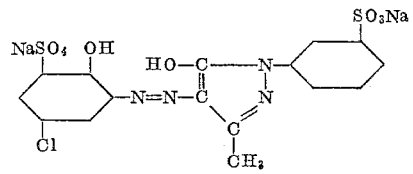

(b) Neolan Yellow BE

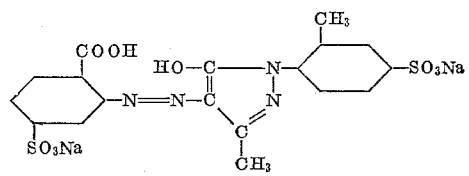

The alkaline earth metal salts which may be added to the dye bath in this invention are salts of the metals of Group IIA of the Periodic Table. The preferred metals are calcium, strontium and barium. Especially preferred is barium. These metals are compounded with any function with which they form a water soluble salt. Thus, for example, chlorides, nitrates, bromides, acetates and chlorates of these metals are suitable. Barium chloride is the preferred compound. The salt is added to the dye bath in a weight which is at least equal to that of the dye in the bath, preferably equal amounts of each are used.

The polymer blend containing the polyolefin resin and chelating agent is melt spun or extruded into fibers or molded objects and then contacted with the alkaline earth metal salt-containing aqueous dye bath. In general the aqueous dye baths employed contain from 0.1 to 10 weight percent of dye based on the weight of the goods to be dyed. The temperature of dyeing and the time of immersion depend on the proportion of polymer in the blend, the particular polymer employed, the concentration of dye employed, and the intensity of color desired. These parameters can easily be determined by routine experimentation. The temperature of dyeing is not critical and can range from 25 to 120° C. although the dye bath is usually maintained at the boiling point.

This invention will be more fully understood by reference to the following examples.

EXAMPLE 1

A polypropylene polymer was formed by passing propylene gas into a dispersion containing $Al(Et)_3$ and $TiCl_3$ in an aromatic diluent at a temperature of 80° C.

Hydrogen was used to control the molecular weight. A crystalline polyproylene results having an intrinsic viscosity of 1.5 (in tetralin at 120° C.) and a melt index of 20. This polymer was spun into fibers by methods known in the art. When these fibers were contacted with the dyes of Table I (infra) dye pickup and retention was very poor.

EXAMPLE 2

When fibers of pure polypropylene containing no added chelate agent were dyed with the Neolan dyes (described in Table I) in the presence of added $BaCl_2$, the fibers were essentially unstained after completion of the dyeing cycle. This shows that the use of BaCl₂, per se, is not effective in getting improved dyeing characteristics if a chelate agent is not present in the fiber.

EXAMPLE 3

Fibers were spun from a polypropylene blend containing 1% iminotriacetic acid (also called nitrilotriacetic acid). This chelating agent has a chelating constant for Ni, Co, Cu and Cr of log $K=10-12$. This blend gave good fibers. These fibers were dyed in the presence of both added sulfuric acid and of added BaCl₂. A control set of samples was also placed in a dyebath with no additive. The dyebaths were prepared so as to contain 0.01 g. of dye/100 cc. of liquor and the skiens of fibers weighed 0.2 gram. The samples dyed as follows:

| Dye | Dye Pickup of Fibers | | |
|---|---|---|---|
| | No Additive | 0.5 g. H₂SO₄ Added | 0.5 g. BaCl₂ Added |
| Neolan Violet 3R | None | Tint | Good. |
| Neolan Blue 2G | do | None | Do. |
| Neolan Green BL | do | do | Do. |
| Neolan Orange R | do | Tint | Do. |
| Neolan Violet Brown B | do | do | Do. |
| Neolan Red GRE | do | None | None. |
| Neolan Yellow BE | do | do | Do. |

The data demonstrate the specific action of the barium ion in giving good dye pickup. Also, they show that dyes, like Red GRE and Yellow BE, which contain two sulfonic acid groups, are not useful.

EXAMPLE 4

A fiber was spun from a blend of 1% 2,2'-dipyridyl in polypropylene. Good quality fibers were obtained. The 2,2'-dipyridyl has a chelating value of log $K=4.4$ for Cu, Fe and Cr. When these fibers were dyed with Neolan dyes and no BaCl₂ was added, no dye was picked up and the fibers were recovered unstained. In the presence of BaCl₂, however, the following results were obtained:

| Dye | Dye Pickup When BaCl₂ is Added | Hours Fadeo-meter Exposure to Break |
|---|---|---|
| Neolan Violet 3R | Good | |
| Neolan Blue 2G | do | 46 |
| Neolan Green BL | do | >70 |
| Neolan Yellow GR | do | 46 |
| Neolan Orange R | do | |
| Neolan Violet Brown B | do | >70 |
| Neolan Orange G | do | >70 |
| Neolan Red GRE | None | |
| Neolan Yellow BE | do | |

Again, the added BaCl₂ gave good dyeability and the dyes containing two sulfonic acid groups were ineffective. These dyed fibers had good resistance to dry cleaning and withstood 30 minutes treatment at 46° C. in perchloroethylene solvent without bleeding.

EXAMPLE 5

Example 4 was repeated using 1% of 1,10-phenanthroline in place of the 2,2'-dipyridyl. Again dyeings occurred when BaCl₂ was present. The 1,10-phenanthroline has a log K of about 5.0 for Cu, Co, Fe, Ni and Cr.

EXAMPLE 6

Example 4 was repeated using 1% 2-(o-hydroxyphenyl) benzothiazole (which has a log K of about 6 with Cr) in place of the dipyridyl. Again, dyeability was obtained only if barium ions were present.

EXAMPLE 7

Example 4 was repeated using 1% dibutyl sulfimide in place of the dipyridyl. Dibutyl sulfimide has a log K of less than 4.0 for Ni, Cr, etc. Although good fibers could be produced, no dyeing could be obtained even in the presence of added BaCl₂.

EXAMPLE 8

Example 4 was repeated using 1% octadecylsulfone in place of the dipyridyl. Octadecylsulfone has a log K of <4.0 with Cr. Good fibers were obtained, but no dyeing took place even in the presence of added BaCl₂.

EXAMPLE 9

Example 4 was repeated using 1% of 2-mercaptobenzothiazole in place of the dipyridyl. The fibers spun from this blend had a slight yellow tinge and dyed well with the mono-sulfonated Neolan dyes in the presence of added BaCl₂.

EXAMPLE 10

Example 4 was repeated using CaCl₂ in place of BaCl₂. Good dyeability was obtained.

EXAMPLE 11

Example 4 was repeated using 1% poly α-pyridyl in place of the dipyridyl. This chelate has a log $K=>4.0$. The resulting fibers dyed well with the mono-sulfonated Neolan dyes when BaCl₂ was added to the dyebath.

EXAMPLE 12

Example 4 was repeated using 2% 2,2'-dipyridyl. Good results were obtained.

EXAMPLE 13

Example 4 was repeated and the fibers were dyed with dyes of the operative class with the exception that the dye-to-metal ratio was 2/1. Only a slight tint was left on the fibers both with and without added BaCl₂. Thus, dyes having a ratio of dye/metal in the complex which is greater than 1/1 are not useful in this invention.

The advantages of this invention are obvious to one skilled in the art. A process is provided which makes possible the successful dyeing of polymers of alpha olefins with satisfactory dye uptake and greatly improved washing, dry cleaning and light stability.

This invention has been described in connection with certain specific embodiments thereof; however, it should be understood that these are by way of example rather than by way of limitation, and it is not intended that the invention be restricted thereby.

What is claimed is:
1. A process for dyeing a poly alpha olefin fiber with a metal-complexed dye comprising the steps of:
   (a) blending an alpha olefin polymer with a chelating agent having a chelate formation constant of at least $1 \times 10^4$ with the metal of the metal-complexed dye,
   (b) forming said blended polymer into fibers,
   (c) contacting said fibers with a metal-complexed dye in the presence of a water-soluble alkaline earth metal salt, said dye containing no more than one sulfonic acid group and being selected from the class consisting of:
      (1) dyes containing at least one o,o'-dihydroxy azo group,
      (2) dyes containing at least one o-carboxy, o'-hydroxy azo group, and
      (3) dyes containing at least one o-amino, o'-hydroxy azo group;
   said complexed metal being selected from the group consisting of nickel, copper, aluminum, iron, cobalt, and chromium, and being present in a mole ratio of about 1/1 relative to the dye.
2. The process of claim 1 wherein the polymer is polypropylene.
3. The process of claim 1 wherein the chelating agent is 2-mercaptobenzothiazole.

4. The process of claim 1 wherein the chelating agent is α,α'-dipyridyl.

5. The process of claim 1 wherein the chelating agent is poly α-pyridyl.

6. The process of claim 5 wherein the polymer is polypropylene.

7. The process of claim 6 wherein the dye is the chrome complex of Acid Orange 74.

References Cited in the file of this patent

UNITED STATES PATENTS

| | | |
|---|---|---|
| 2,520,105 | Millson | Aug. 22, 1950 |
| 2,984,634 | Caldwell | May 16, 1961 |
| 3,023,072 | Dabrowski | Feb. 27, 1962 |
| 3,039,840 | Sawaya | June 19, 1962 |

FOREIGN PATENTS

| | | |
|---|---|---|
| 514,069 | Great Britain | Oct. 30, 1939 |
| 933,622 | Germany | Sept. 29, 1955 |

OTHER REFERENCES

Grieveson: Reports on the Progress of Applied Chemistry, vol. XLVI, 1961, pages 276, published 1961 by Soc. Chem. Ind., London, England.

Roberts: Reports on the Progress of Applied Chemistry, vol. XLV, 1960, pages 370–372, published 1960 by Soc. Chem. Ind., London, England.

Journal of the Textile Institute, page A552, November 1962.

American Dyestuff Reporter, pages 31–34, Jan. 21, 1963.